Oct. 27, 1959  C. W. LEWIS  2,909,868
ANIMATED TOY
Filed March 28, 1958  2 Sheets-Sheet 1
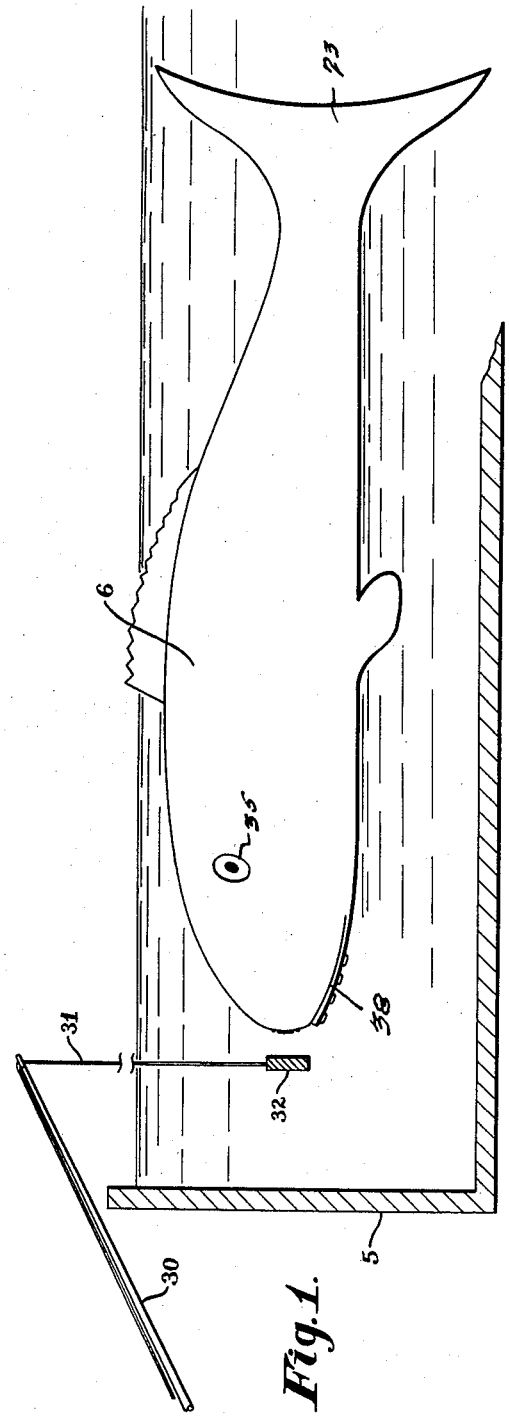
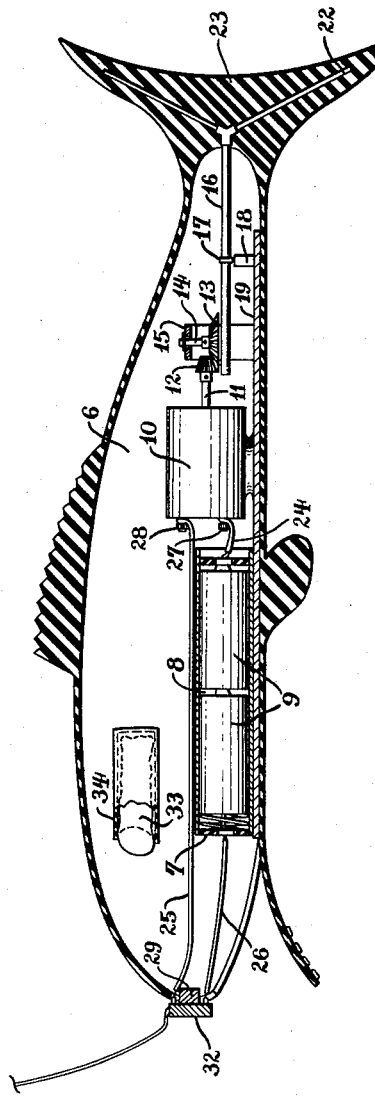
INVENTOR
Clarence W. Lewis
BY
ATTORNEY Oct. 27, 1959　　　C. W. LEWIS　　　2,909,868
ANIMATED TOY Filed March 28, 1958　　　　　　　　　　2 Sheets-Sheet 2

INVENTOR
Clarence W. Lewis
BY
ATTORNEY

United States Patent Office 2,909,868
Patented Oct. 27, 1959

2,909,868

ANIMATED TOY

Clarence W. Lewis, Phoenix, Ariz.

Application March 28, 1958, Serial No. 724,614

2 Claims. (Cl. 46—241)

This invention relates to toys and more particularly to a toy including a body designed to simulate a fish of a buoyant construction so that the body or fish will float in a tank or receptacle containing water.

An important object of the invention is to provide electrically controlled mechanism for moving the tail portion of the fish laterally simulating the movements of a fish caught on a fishing line.

A further important object of the invention is to provide an iron plug sensitive to magnetic influence, located at the mouth of the body to be attracted by a permanent magnet secured to a fishing line in lieu of the conventional fish hook, so that when the line is dropped into the tank or body of water, and is moved to a position adjacent to the iron plug, the permanent magnet will become attached to the iron plug holding the body of the fish in much the same manner as a fish caught by a fish hook.

Still another object of the invention is to provide a toy wherein the magnet will complete an electrical circuit between a motor and batteries within the body operating to move portions of the body simulating the movements of a fish.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a fragmental sectional view of a tank showing a simulated toy fish constructed in accordance with the invention, as positioned therein.

Fig. 2 is a longitudinal sectional view through the body of the fish.

Figure 3:
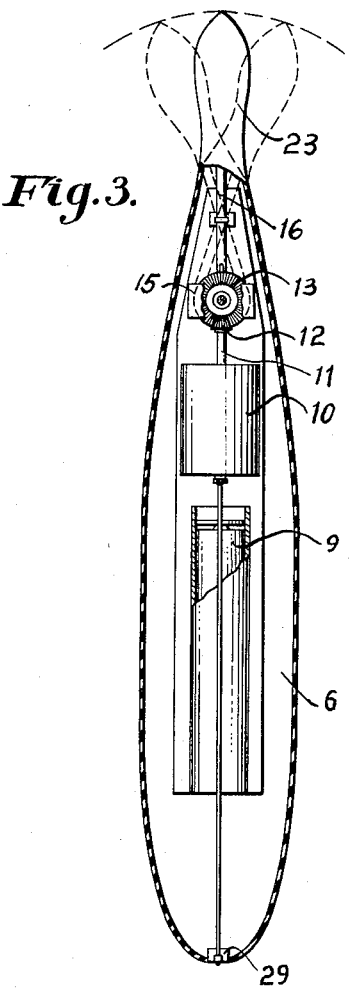
Fig. 3 is a longitudinal sectional view through the fish taken at right angles to Fig. 1.
Figure 5:
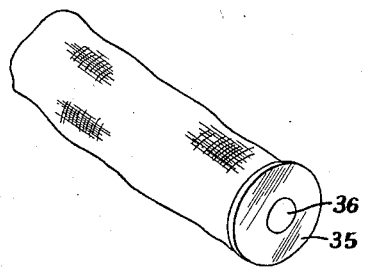
Fig. 5 is a perspective view of a removable ballast containing bag forming part of the invention.
Figure 6:
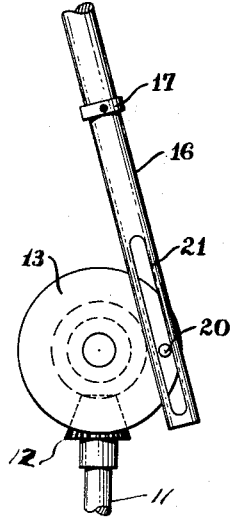
Fig. 6 is a detail view illustrating the operating mechanism for the fish connected between the motor and tail of the fish.
Figure 4:
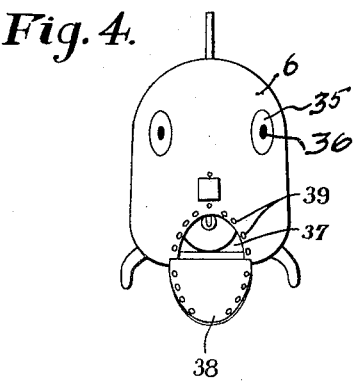
Fig. 4 is a front elevational view of the fish.

Referring to the drawings in detail, a tank containing a quantity of water, is indicated generally by the reference character 5, in which the simulated fish toy body, indicated by the reference character 6, floats.

The body of the fish is constructed preferably of plastic material, such as rubber or the like, and is provided with a partition 7 spaced from the lower edge of the body of the fish, providing a compartment 8, for the reception of batteries 9.

Supported within the body 6 is a motor 10, which has its shaft 11 extending rearwardly from one end of the motor, where it is supplied with a pinion 12 that meshes with a pinion 13 mounted on the lower end of shaft 14, that in turn is supported in a bearing formed in the bracket 15.

The reference character 16 indicates a shaft which is mounted for horizontal and reciprocatory movement in the bearing 17, secured at the upper end of the support 18, where it is secured to the plate 19 extending throughout substantially the entire length of the inner surface of the bottom of the body.

The forward end of the shaft 16 is eccentrically connected to the lower surface of pinion 13 by means of the downwardly extended pin 20, which moves in the slot 21 that is elongated longitudinally of the shaft 16.

Laterally extended rods 22 are connected to the rear end of the shaft 16 and are embedded in the tail portion 23 of the body 6, and since the body 6 is constructed of flexible material, it will be seen that with the swinging movement of the shaft 16 and rods 22, the tail portion 23 of the body will be moved from side to side, simulating the movements of the tail of a fish in moving through a body of water.

The motor 10 is connected with the batteries 9, through the wires 24, 25 and 26 which provide the circuit between the batteries and the motor 10, the wires 24 and 25 being connected with the terminals 27 and 28, respectively, of the motor 10.

The wires 25 and 26 extend to a point adjacent to the front end or mouth of the fish and are disposed adjacent to the magnetic block 29, secured at the front end of the body. A fishing pole 30 supports a fishing line 31 which carries a permanent magnet 32 at its end, the permanent magnet 32 being so constructed that it will attract the animated fish toy or body when moved to a position in proximity thereto and afford means for connecting the body to a fishing line so that it may be removed from the tank, as in fishing.

The body 6 of the toy is provided with openings adjacent to the front end thereof, the openings representing eye openings of a fish, through which bags 33 containing ballast are inserted in the compartments 34 located with their open ends disposed adjacent to the eye openings. Each of the ballast bags 33 is provided with a plug 35 formed with a circular line indicating a fish eye 36. Thus it will be seen that due to this construction the ballast bags may be readily removed and the ballast adjusted to maintain the body of the fish in a natural upright position.

In the operation of the device the magnet 32 when engaging the ends of the wires 25 and 26, will complete a circuit to the motor 10 causing the motor to operate the shaft 11, which in turn oscillates the shaft 16 through the pinions 12 and 13, causing the tail portion 23 to swing laterally, as shown in dotted lines in Fig. 3 of the drawings, providing a toy which is exceptionally attractive.

It might be further stated that the forward end of the body 6 is formed with an opening 37 through which access may be had to the batteries 9 and motor 10. This opening is normally closed by the flap closure 38 which forms a part of the body 6 and is held in its closed and sealed position by snap fasteners 39.

From the foregoing it is believed that the operation of the toy will be apparent and that further descriptive matter and disclosure is unnecessary.

Having thus described the invention, what is claimed is:

1. An animated toy fish comprising a hollow flexible body having a tail section, a horizontally oscillating shaft mounted within said body, one end of said shaft being connected to said tail section adapted to swing said tail section laterally in opposite directions, an electric motor mounted within said body, gearing operated by said motor for oscillating said shaft, a battery within said body, wires having exposed ends providing a circuit between said battery and motor, a magnetic block mounted at the front of said body, the exposed ends of said wires being secured adjacent to said magnetic block, and a fishing line having a permanent magnet secured to the end thereof adapted to attract said magnetic block and body upon contact therewith, said permanent magnet adapted to bridge the ends of said wires at the magnetic block completing the circuit to said motor operating said shaft and tail section.

2. An animated toy fish comprising a buoyant body, constructed of flexible material, having a tail section, a motor mounted within said body, batteries within said body, wires providing an electric circuit between said batteries and motor, a magnetic block mounted at the front of said body, said wires having exposed ends adjacent to said block, a fishing line having a permanent magnet on the end thereof adapted to attract said magnetic block and simultaneously bridge the wire ends and thereby complete the electrical circuit to said motor, and means for transmitting movement from said motor to said tail section oscillating said tail section.

References Cited in the file of this patent

UNITED STATES PATENTS

| | | |
|---|---|---|
| 726,020 | Bryan | Apr. 21, 1903 |
| 726,021 | Bryan | Apr. 21, 1903 |
| 2,505,626 | Palmer | Apr. 25, 1950 |
| 2,510,309 | Drago | June 6, 1950 |
| 2,557,789 | Lamka | June 19, 1951 |
| 2,645,883 | De Salvo | July 21, 1953 |
| 2,749,663 | Lemelson | June 12, 1956 |